(12) United States Patent
Jagdale et al.

(10) Patent No.: US 8,689,940 B2
(45) Date of Patent: Apr. 8, 2014

(54) LUBRICATION SYSTEM FOR A BREAKING TOOL

(75) Inventors: Rakesh D. Jagdale, Waco, TX (US); Lauritz D. Pillers, II, McGregor, TX (US)

(73) Assignee: Caterpillar Inc., Peoria, IL (US)

( * ) Notice: Subject to any disclaimer, the term of this patent is extended or adjusted under 35 U.S.C. 154(b) by 405 days.

(21) Appl. No.: 13/212,415

(22) Filed: Aug. 18, 2011

(65) Prior Publication Data

US 2012/0043163 A1    Feb. 23, 2012

Related U.S. Application Data

(60) Provisional application No. 61/375,098, filed on Aug. 19, 2010.

(51) Int. Cl.
| | |
|---|---|
| *F01M 1/18* | (2006.01) |
| *F16K 31/12* | (2006.01) |
| *F16N 7/38* | (2006.01) |
| *F01M 1/02* | (2006.01) |
| *F01M 11/10* | (2006.01) |

(52) U.S. Cl.
USPC ............................ 184/6.4; 184/6.14; 137/386

(58) Field of Classification Search
USPC ............. 184/6.4, 6.14, 7.4; 173/177; 137/386
See application file for complete search history.

(56) References Cited

U.S. PATENT DOCUMENTS

| | | |
|---|---|---|
| 1,629,730 A | 5/1927 | Penberthy |
| 1,849,819 A | 2/1932 | Smith, Jr. |
| 1,971,772 A | 8/1934 | Curtis |
| 1,968,901 A | 10/1934 | Neil |
| 2,827,860 A | 3/1958 | Roberts |
| 2,869,374 A | 1/1959 | Morris |
| 3,040,835 A | 6/1962 | Ahnert |
| 3,129,788 A | 4/1964 | Heckt |
| 3,193,028 A | 7/1965 | Radizimovsky |
| 3,487,892 A | 1/1970 | Kiefer |
| 3,490,549 A | 1/1970 | Catterson |
| 3,587,782 A | 6/1971 | Russell et al. |
| 3,595,342 A | 7/1971 | O'Leary |
| 3,661,216 A | 5/1972 | Yamanaka |
| 3,664,462 A | 5/1972 | Smith, Sr. |
| 3,749,186 A | 7/1973 | Kutuzov et al. |
| 3,774,700 A | 11/1973 | Shepherd |
| 3,966,019 A | 6/1976 | Heikkila et al. |
| 4,149,602 A | 4/1979 | James |
| 4,157,121 A | 6/1979 | Amtsberg et al. |
| 4,190,116 A | 2/1980 | O'Neal et al. |
| 4,289,209 A | 9/1981 | Salmi |
| 4,333,538 A | 6/1982 | Ekwall |

(Continued)

FOREIGN PATENT DOCUMENTS

| | | |
|---|---|---|
| EP | 0486752 | 4/1991 |
| EP | 0593839 | 4/1994 |

(Continued)

*Primary Examiner* — William E Dondero
*Assistant Examiner* — Robert T Reese

(57) ABSTRACT

A lubrication system for a work tool, such as a demolition hammer, that is powered by a drive fluid. The lubrication system including a valve member movable from a first position to a second position in response to receiving an input indicative of a low level of a lubricant, wherein in the second position, the valve member is configured to divert the drive fluid to shutdown or derate the tool.

13 Claims, 7 Drawing Sheets

(56) References Cited

U.S. PATENT DOCUMENTS

| | | | |
|---|---|---|---|
| 4,467,892 A * | 8/1984 | Van de Bogert | 184/7.4 |
| 4,474,248 A | 10/1984 | Musso | |
| 4,598,796 A | 7/1986 | Barrows | |
| 4,793,719 A | 12/1988 | Crockett et al. | |
| 5,060,761 A | 10/1991 | Arndt | |
| 5,293,959 A | 3/1994 | Kimberlin | |
| 5,351,763 A | 10/1994 | Muuttonen | |
| 5,385,209 A | 1/1995 | Bodell et al. | |
| 5,549,031 A | 8/1996 | Giordano | |
| 5,562,170 A | 10/1996 | Wolfer et al. | |
| 5,653,295 A | 8/1997 | Juvonen et al. | |
| 6,070,678 A | 6/2000 | Pascale | |
| 6,116,301 A | 9/2000 | Deimel et al. | |
| 6,145,625 A | 11/2000 | Prokop et al. | |
| 6,273,199 B1 | 8/2001 | Kiiikka et al. | |
| 6,405,810 B1 | 6/2002 | Grach et al. | |
| 6,510,904 B1 | 1/2003 | Tyrrell | |
| 6,631,787 B2 | 10/2003 | Conley et al. | |
| 7,900,748 B2 * | 3/2011 | Bukhari et al. | 184/6.14 |
| 2006/0048957 A1 | 3/2006 | Oksman | |
| 2006/0243528 A1 | 11/2006 | Bukhari et al. | |
| 2008/0296035 A1 * | 12/2008 | Lohmann et al. | 173/177 |

FOREIGN PATENT DOCUMENTS

| | | |
|---|---|---|
| EP | 0935090 | 8/1999 |
| EP | 1112820 | 7/2001 |
| EP | 1321245 | 6/2003 |
| JP | 57190894 | 11/1982 |
| JP | 20030340747 | 12/2003 |
| WO | 0233309 | 4/2002 |
| WO | 03053639 | 7/2003 |

* cited by examiner

LUBRICATION SYSTEM FOR A BREAKING TOOL

TECHNICAL FIELD

This disclosure relates to a lubrication system for a work tool powered by a drive fluid, and more particularly to a lubrication system for a hydraulic or pneumatic hammer. This disclosure also relates to a method of lubricating a work tool.

BACKGROUND

Demolition hammers are used on work sites to break up objects such as rocks, concrete, asphalt, frozen ground, or other hard objects. The hammers may be mounted to machines, such as back hoes and excavators, or may be handheld. The hammers may be powered by a hydraulic or pneumatic pressure source. In operation, a high pressure fluid drives a piston to strike a tool bit, which in turn, strikes rock, concrete, asphalt or other hard object to be broken up.

Lubrication systems are used to supply lubricant, such as grease, to bearing surfaces in the hammer to reduce friction between moving parts, such as between the tool bit and bushings that are used to align the tool bit. The lubrication system may be separate from the hammer, for example by being mounted on a carrier machine, or mounted to the hammer, i.e. an on-board system. Whether externally mounted or on-board, a lubricant supply is provided with the system. Operating the hammers without lubrication can result in significant damage to the hammer. In order to monitor the amount of lubricant remaining, many systems provide inspection windows, so that an operator can visually monitor the amount of lubricant remaining. Such systems, however, are dependent on the operator taking the necessary steps to manually check the window.

The system in U.S. Pat. No. 5,060,761, to Arndt, et al., discloses a lubrication system that uses a limit switch in the lubricant reservoir. When the lubricant level approaches a predetermined limit position, a horn and a warning lamp are activated to alert an operator to a low lubricant level. In addition, the limit switch can also be used to provide a signal to a control valve, which in turn actuates a turn-off valve that interrupts the operating pressure to the hammer, thus shutting off the hammer when the lubricant level has reached the predetermined limit position.

While the '761 patent provides a low lubricant warning and shutdown feature, it requires multiple additional components to activate, such as a limit switch, a control valve, a shut-off valve, and a power source to actuate the control valve.

SUMMARY

In one aspect, the present disclosure is directed to a lubrication system for a tool powered by a drive fluid, including a valve member movable from a first position to a second position in response to receiving an input indicative of a low level of a lubricant, wherein in the second position, the valve member is configured to divert the drive fluid to shutdown or derate the tool.

In some embodiments of the lubrication system, the input indicative of a low level of lubricant comprises a plunger, associated with a lubricant reservoir, engaging the valve member. The plunger may be disposed within the lubricant reservoir, which may be a grease cartridge. In addition, in some embodiments the lubrication system includes a housing having a drive fluid inlet and a drive fluid outlet, wherein the valve member is disposed in the housing, and wherein in the first position the drive fluid inlet is not in fluid communication with the drive fluid outlet and in the second position the drive fluid inlet is in fluid communication with the drive fluid outlet. Furthermore, in some embodiments the valve member includes a lubricant seal portion configured to prevent the lubricant from mixing with drive fluid within the passage and a drive fluid seal portion configured to block a flow of drive fluid into the passage when the valve member is in the first position.

In another aspect, the present disclosure is directed to a lubrication system for a tool powered by a drive fluid, including a housing configured to receive a lubricant reservoir, a spool disposed at least partially in the housing, the spool adapted to move between a first position and a second position in response to fluid pressure of the drive fluid, and a lubricant pumping mechanism operable by movement of the spool between the first position and the second position to displace a lubricant from the lubricant reservoir.

In some embodiments, the lubrication system includes a valve assembly that includes a spool, a first sleeve extending outward from the housing, a second sleeve received at least partially in the housing, wherein the spool is received at least partially within the first sleeve and the second sleeve. Furthermore, in some embodiments of the lubrication system, the spool and the second sleeve form a lubricant charge chamber, wherein movement of the spool between the first position and the second position forces the lubricant out of the lubricant charge chamber.

Various embodiments of the present disclosure may contain only a subset of the elements and advantages set forth. No one advantage is critical to the embodiments. Any claimed embodiment may be technically combined with any other claimed embodiment(s).

BRIEF DESCRIPTION OF THE DRAWINGS

In the accompanying drawings, which are incorporated in and constitute a part of this specification, exemplary embodiments of the disclosure are illustrated, which, together with the written description, serve to explain the principles of the disclosed system.

DETAILED DESCRIPTION

Figure 1:
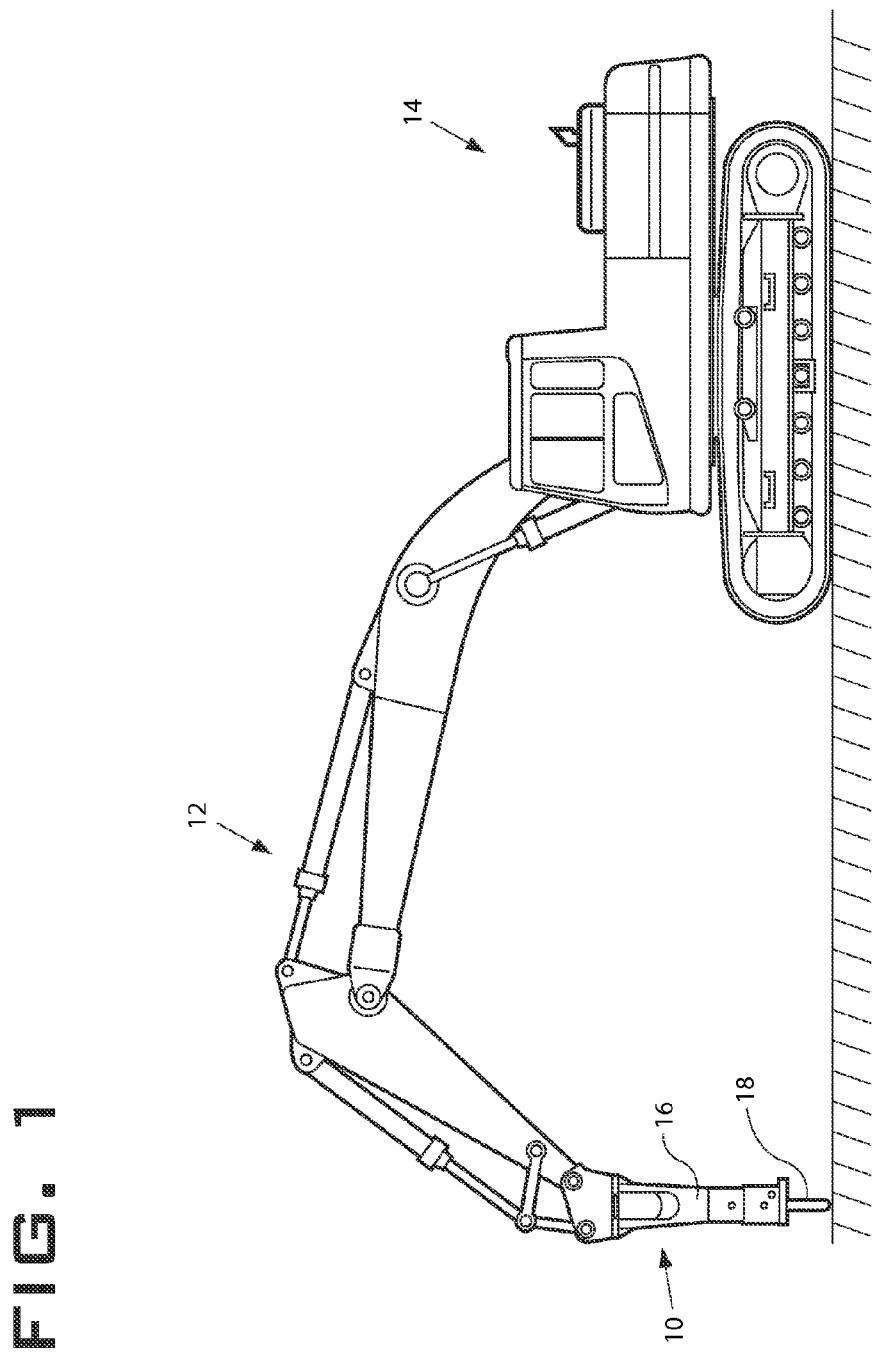
FIG. 1 is a schematic view of an embodiment of a tool attached to an excavator.

Referring to FIG. 1, a work tool 10 powered by a drive fluid is attached to a boom 12 of an excavator 14. The work tool 10, however, may be connected to any suitable machine or base. In the depicted embodiment, the work tool 10 is a hydraulic or pneumatic powered breaking tool, such as a demolition hammer. When attached to the excavator 14, as illustrated, the excavator's hydraulic system may be used to power the tool. Thus, the drive fluid may be hydraulic fluid. The present disclosure, however, is applicable to other hydraulic or pneumatic tools and to tools powered by other means. The work tool 10 includes a power cell 16 and a tool 18. The power cell 16 is configured to provide a breaking force via the tool 18 to an object, such as rocks, concrete, asphalt, frozen ground, or other hard objects.

Figure 2:
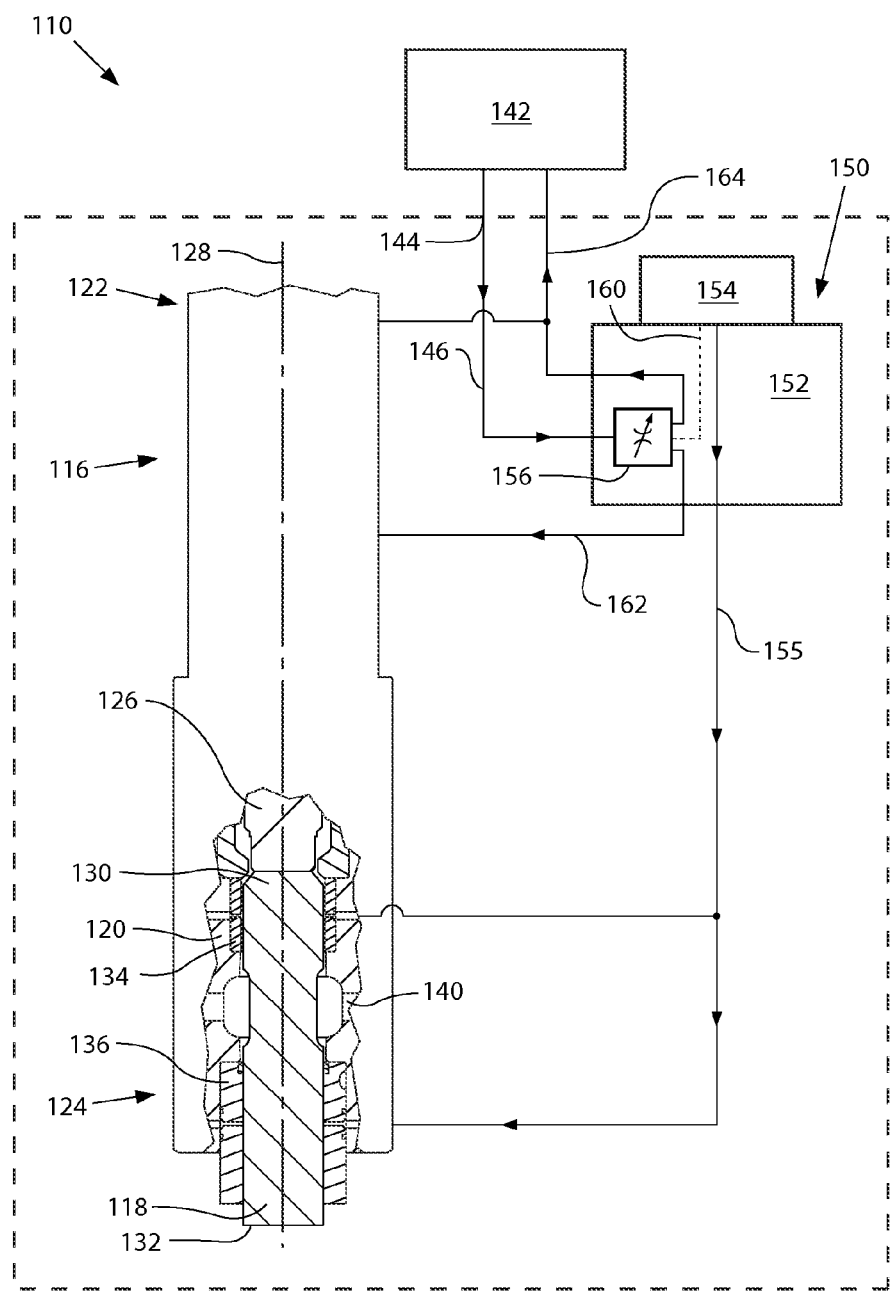
FIG. 2 is a schematic and cross-sectional view of an embodiment of the tool provided with a lubricating system according to the present disclosure.
Figure 3:
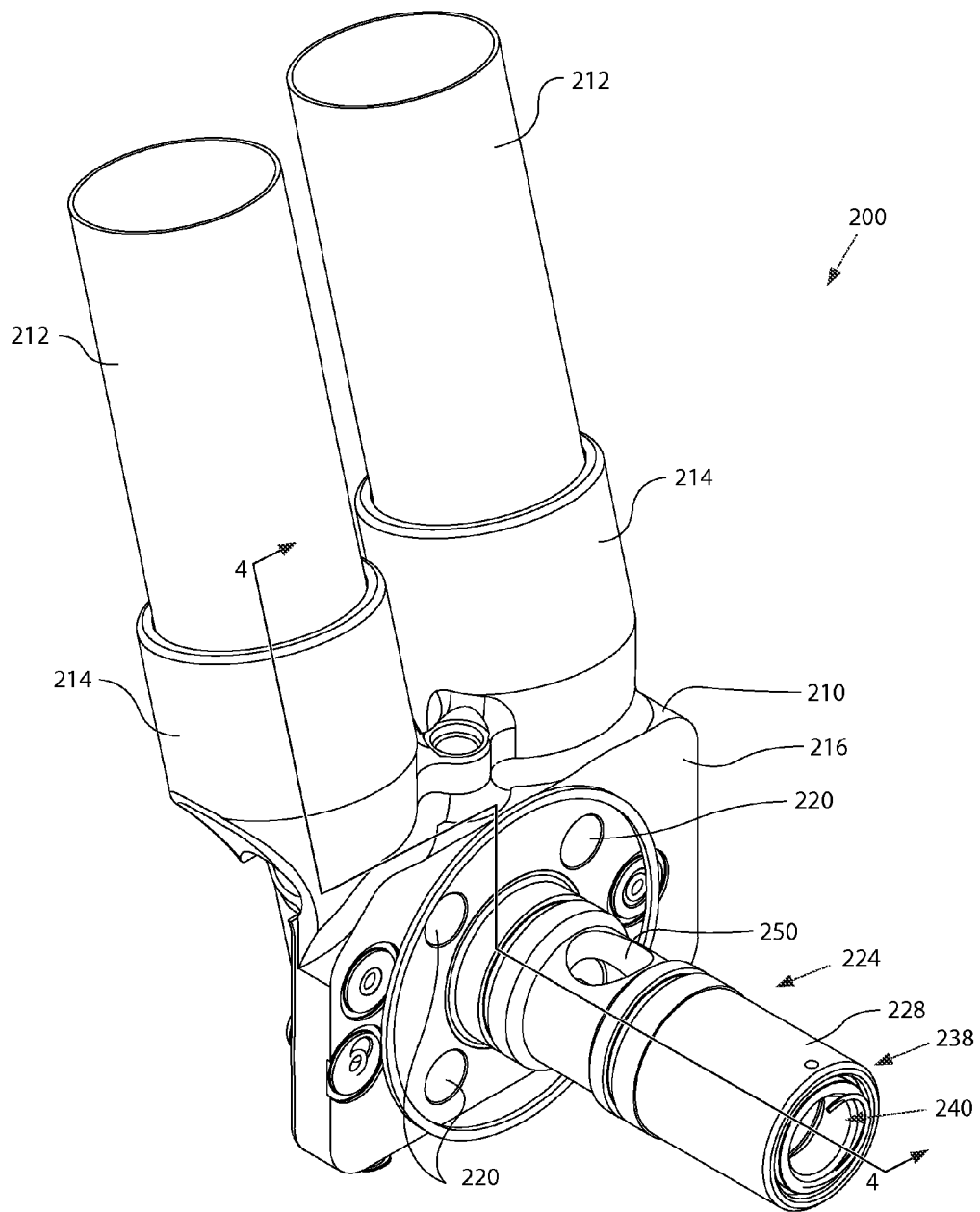
FIG. 3 is an isometric view of an embodiment of the lubricating system according to the present disclosure.

FIG. 2 is a schematic illustration of an embodiment of a work tool 110 powered by a drive fluid according the present disclosure. The work tool is illustrated as a demolition hammer 110, such as a hydraulic hammer. The hammer 110 includes a power cell 116 and a tool 118. The power cell 116 includes a housing 120 having an upper end 122 and a lower end 124. The housing 120 may be formed as a single piece or may consist of a plurality of pieces and may be configured in a variety of ways. A piston 126 is disposed within the housing 120 and is movably along an axis 128. The tool 118 is also disposed within the housing 120 and is movably along the axis 128. The tool 118 includes a first end 130 and a second end 132. The first end 130 is configured and positioned in the housing to be struck by the piston 126. The second end 132 of the tool 118 extends from the lower end 124 of the housing 120 to be engaged with objects to be broken.

The power cell 116 may also include an upper bushing 134 and a lower bushing 136. The upper bushing 134 and the lower bushing 136 are fixably held within the housing 120 by cross pins or other suitable means. The tool 118 is slidebly received with the upper bushing 134 and the lower bushing 136. The tool 118 is retained within the housing 120 by retaining pins 140 or other suitable retention devices.

A drive fluid source 142 may be associated with the hammer 110. The drive fluid source 142 may be configured to, on demand, deliver pressurized drive fluid to the hammer for use in driving the piston 126. A pressure source, such as a fluid pump (not shown) or other suitable pressure source may be associated with the drive fluid source 142 to pressurize the drive fluid. The drive fluid source 142 may be in fluid communication with a fluid inlet 144 on the hammer 110 via a first fluid passage 146.

A lubrication system 150 is associated with the hammer 110. In FIG. 2, the lubrication system 150 is depicted within a dashed box that includes the power cell 116, thus indicating that the lubrication system 150 and the power cell 116 are formed integrally as a unit. For example, U.S. Pat. No. 7,900,748, the disclosure of which is fully incorporated herein by reference, discloses an embodiment of a lubrication system for a hydraulic or pneumatic tool in which the lubrication system is integral with the tool and no external hoses or other components are required. The lubrication system 150, however, may alternatively be externally mounted, for example by being mounted on a carrier machine or may be an on-board system that is mounted on the hammer and in fluid communication with the hammer via hoses or other conduits.

The lubrication system 150 includes a housing 152 in fluid communication with a lubricant reservoir 154. Any suitable lubricant may be used, such as grease for example. The lubrication system 150 is in fluid communication with the power cell 116 via a second fluid passage 155. The second fluid passage 155 communicates lubricant to each of the upper bushing 134 and the lower bushing 136. For ease of illustration, a portion of second fluid passage 155 is illustrated external to housing 120, though in some embodiments, the second fluid passage 155 may consist of internally formed conduits in the housing 152.

The lubrication system 150 includes a movable valve member 156. The movable valve member 156 may be configured in a variety of way. Any member configured to move from a first position to a second position in response to an input (indicated by dashed line 160) indicative of an empty or near empty lubricant reservoir 154, may be used. In the first position, drive fluid flowing through the first fluid passage 146 may be directed to the hammer 110 via a third fluid passage 162 in order to act upon the piston 126. In the second position, all or a portion of the drive fluid flowing through the first fluid passage 146 may be diverted away from acting on the piston 126. For example, in the second position, all or a portion of the fluid flowing through the first fluid passage 146 maybe diverted back to the drive fluid source 142 via a bypass passage 164. In this manner, when a low amount of lubricant within the lubricant reservoir 154 is indicated, the hammer 110 is disabled or derated (a reduced or limited amount of pressurized fluid being delivered to the piston).

The input indicative of little or no remaining lubricant may be any suitable input. For example, in one embodiment the input may be a mechanical input such as a physical engagement or contact between two parts. In another embodiment, the input may be a pressure difference across a valve such that a change in pressure acting on the valve causes the valve to move.

FIGS. 3-7 illustrate an embodiment of a lubrication system 200 for a work tool powered by a drive fluid of the present disclosure. The lubrication system 200 includes a housing 210 and two lubricant reservoirs 212, such as two grease cartridges. The lubricant reservoirs 212 in the depicted embodiment are grease cartridges, though other suitable lubricants can be used. In addition, other embodiments may have more or less than two reservoirs. The housing 210 receives the lubricant reservoirs 212 in recesses 214 in its upper surface of the housing. The recesses 214 include seats for various seals (not shown), which prevent lubricant from the reservoirs 212 from leaking out of the top of the recesses 214.

The housing 210 is configured to mount to a body portion 234 of the hammer 110 to form an on-board or integrated lubricant system with the hammer. In other embodiments, the lubricant system can be separate from the hammer, for example by being mounted on a carrier machine. The lower portion of the housing 210 includes a face portion 216 having a plurality of apertures 220 for receiving fasteners, such as bolts, to attach the housing 210 to the body portion 234. The apertures 220 extend between the front and the rear of the housing 210. Between these apertures 220, is a central aperture 222 that receives a valve assembly 224.

Figure 4:
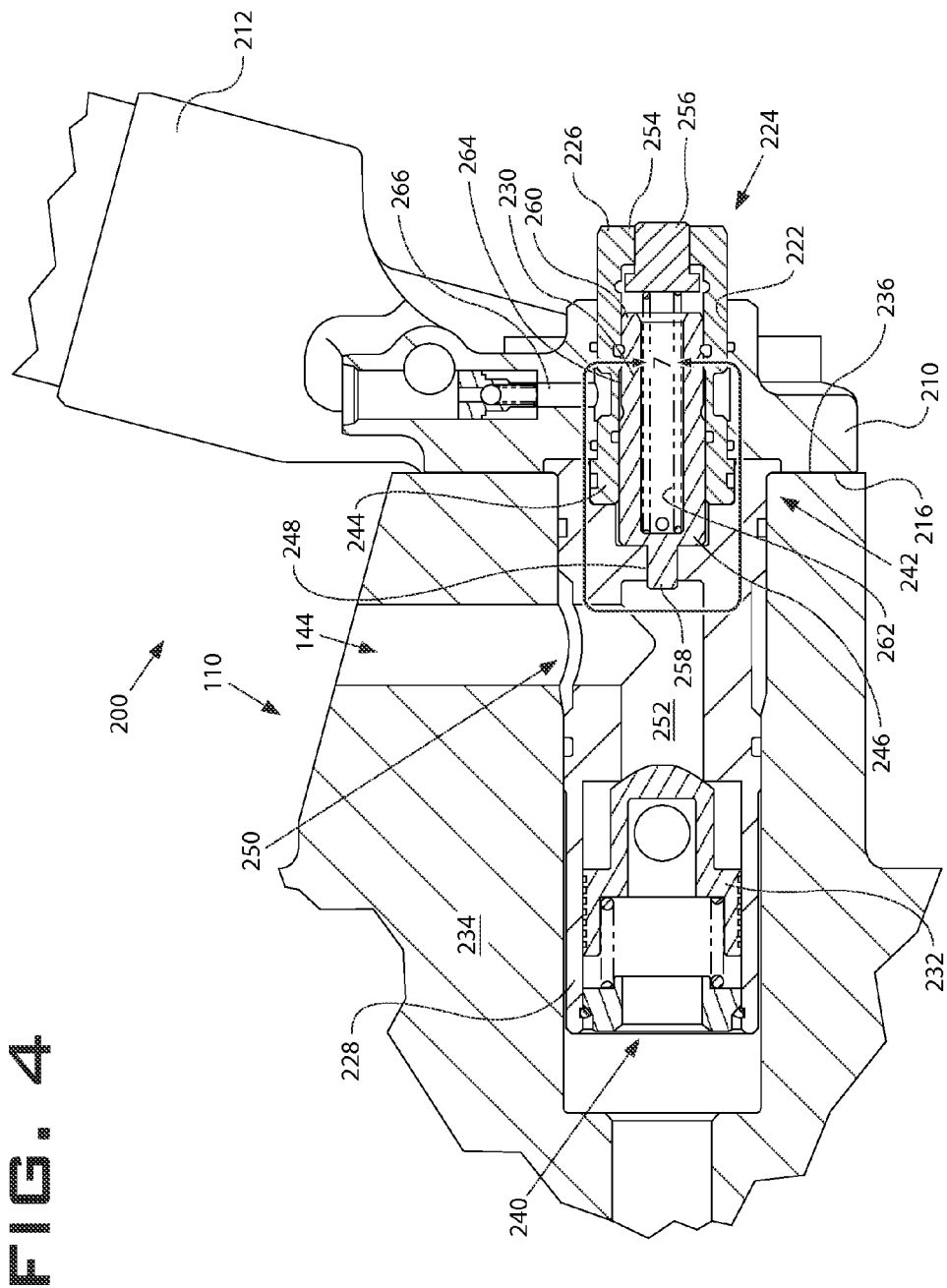
FIG. 4 is a partial cross-section view of the lubricating system of FIG. 3 attached to a breaking tool.

In the depicted embodiment, the valve assembly 224 includes a cap sleeve 226, a sleeve 228, a spool 230, and a check valve member 232. The sleeve 228 extends outward from the face portion 216. When mounted onto the hammer 110, as shown in FIG. 4, the sleeve 228 extends into a body portion 234 of the hammer 110 and the face portion 216 engages an exterior surface 236 of the body portion 234.

The cap sleeve 226, the sleeve 228, and the spool 230 are hollow and substantially cylindrical. A first end 238 of the sleeve 228 is open and defines a fluid outlet 240. A second end 242 of the sleeve 228 includes a recess for receiving a first end 244 of the cap sleeve 226 and a first end 246 of the spool 230. A dividing wall 248 is positioned between the first end 238 and the second end 242. The sleeve 228 includes a fluid inlet 250 that is in fluid communication with the fluid outlet 240 through the hollow passage 252 in the sleeve 228.

The first end 244 of the cap sleeve 226 is open for receiving the spool 230 and a second end 254 of the cap sleeve 28 is closed by a plug 256.

The spool 230 includes a projection 258 that extends from its first end 246, through an aperture in the dividing wall 248 and into the passage 252 in the sleeve 228. The projection 258 has a first contact surface area A1 (see FIG. 7) that drive fluid pressure may act on. The spool 230 can move between a first position, where the spool 230 abuts the dividing wall 248 of the sleeve 228, and a second position, where the spool 230 abuts the second end 250 of the cap sleeve 28.

The spool 230 has a second end 260 that has a recess in which a spring 262 is received. The spring 262 extends between the first end 246 of the spool 230 and the second end 254 of the cap sleeve 226 and urges the spool 230 against the dividing wall 248.

Similar to the spool and cap sleeve disclosed in U.S. Pat. No. 7,900,748, the exterior surface of the spool 230 and the interior surface of the cap sleeve 226 have portions with varying diameters. These portions define a lubricant charge chamber 264 that changes in volume when the spool 230 moves axially relative to the cap sleeve 226. The lubricant charge chamber 264 is in communication with the lubricant reservoirs 212 via passages in the housing 210, such as lubricant passage 266. Thus, lubricant charge chamber 264 may be filled with lubricant. A portion of the spool 230 includes a second contact surface area A2 (see FIG. 7) that may be used to drive lubricant from the chamber 264. In the depicted embodiment, the first contact surface area A1 is greater than the second contact surface area A2. In one embodiment, the ratio of first contact surface area A1 to second contact surface area A2 is approximately 2.2:1 to approximately 1.8:1. In another embodiment, the ratio of first contact surface area A1 to second contact surface area A2 is approximately 2:1.

The check valve member 232 is positioned within the passage 252 between the fluid inlet 250 and the fluid outlet 240. The check valve member 232 may be formed in a variety of ways. The check valve member 232 is spring biased against a shoulder within the passage 252 to prevent fluid flow from the fluid outlet 240 to the fluid inlet 250. Pressure from the drive fluid system can overcome the spring force and allow fluid flow from the fluid inlet 250 to the fluid outlet 240.

Figure 5:
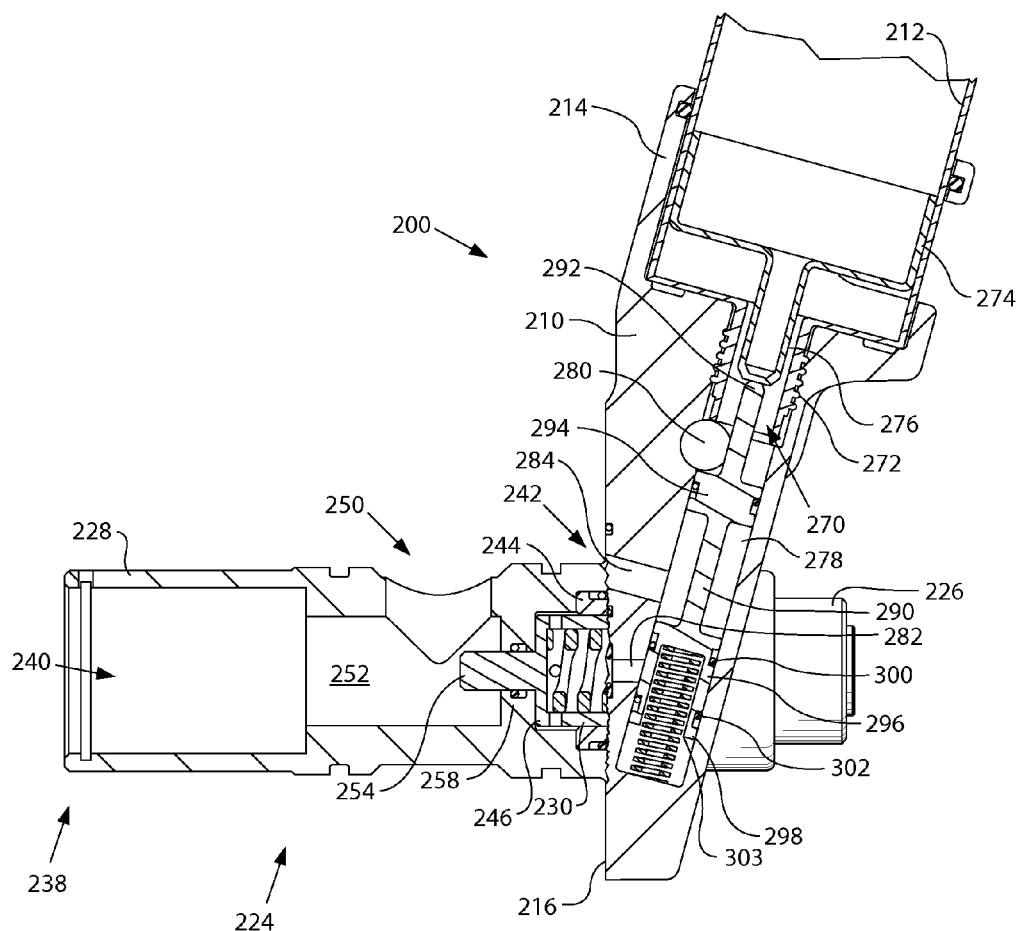
FIG. 5 is a partial cross-section view of the lubricating system of FIG. 3 at a first lubricant level.
Figure 6:
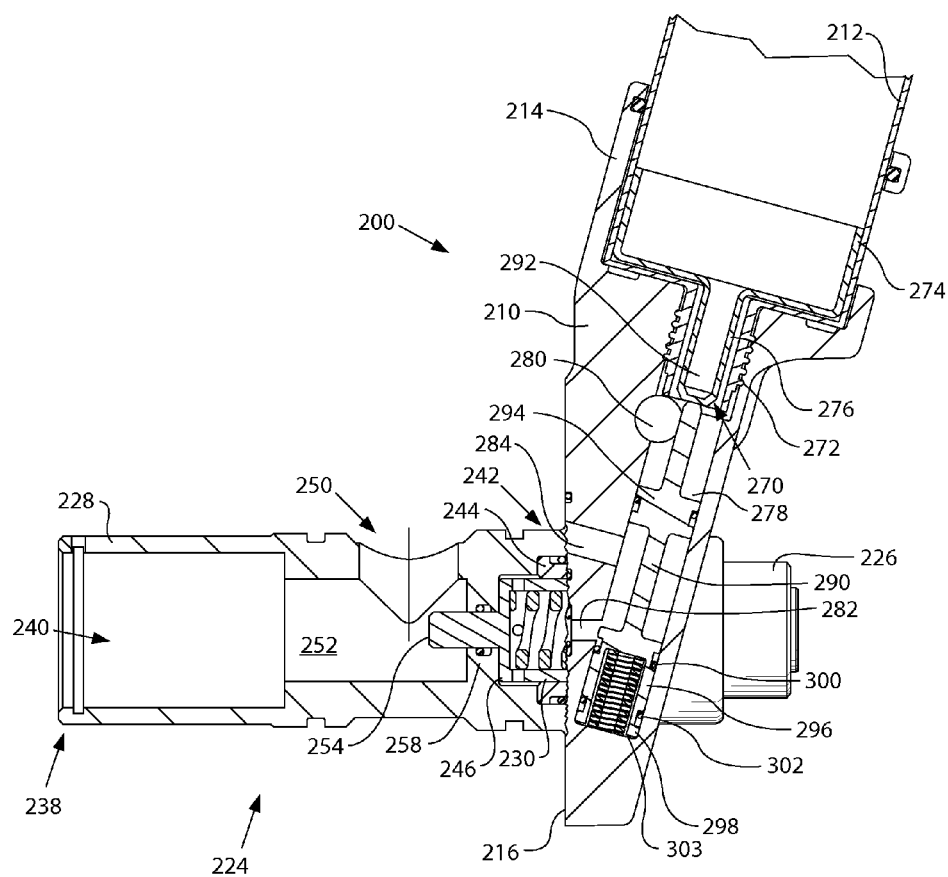
FIG. 6 is a cross section view of the lubricating system of FIG. 3 at a second lubricant level.
Figure 7:
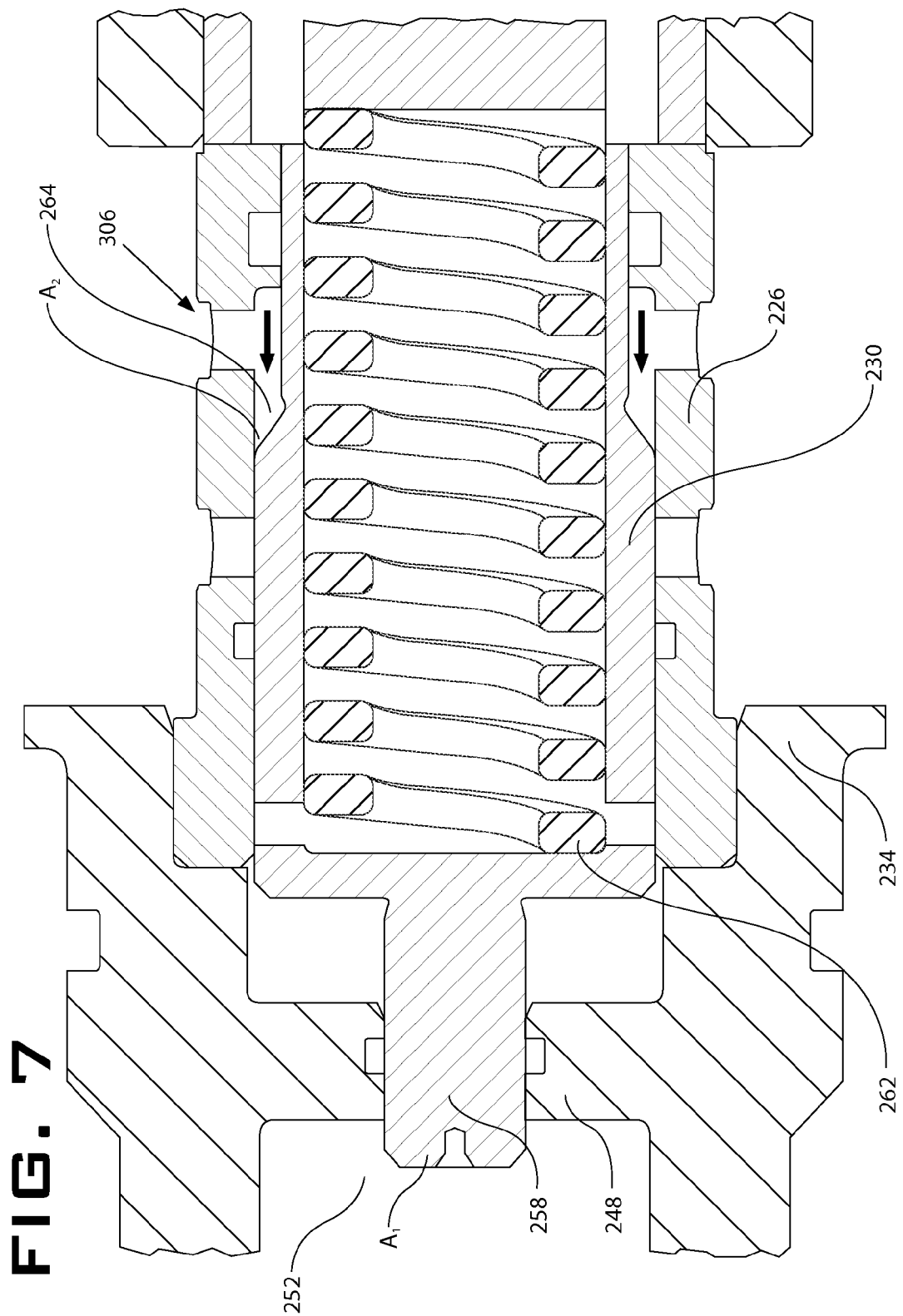
FIG. 7 is a magnified cross section view of a portion of the lubricating system of FIG. 3.

Referring to FIGS. 5 and 6, the lubrication system 200 includes a system that automatically reacts to a low lubricant volume in one or more of the reservoirs. In the depicted embodiment, the lubricant reservoirs 212 are hollow and substantially cylindrical. The lubricant reservoirs 212 are configured to couple to the housing 210, such as by threads or other suitable fasteners. For example, in FIGS. 5-6, the lubricant reservoirs 212 include a hollow projection configured to be received within a corresponding recess in the housing 210. The hollow projection defines a lubricant outlet 270 and includes, on an exterior surface, threads 272 configured to couple to corresponding threads on the housing 210.

Each lubricant reservoir 212 also includes a plunger 274 disposed within the reservoir. In a lubricant reservoir 212, lubricant is disposed between the plunger 274 and the lubricant outlet 270. As lubricant is extracted from the reservoir 212, the plunger 274 follows the lubricant level toward the lubricant outlet 270. On at least one of the lubricant reservoirs 212, the plunger 274 includes a projection 276 that is configured to be received with the hollow projection of the lubricant reservoir 212.

The housing 210 includes a passage 278 extending generally coaxial with the hollow projection of the lubricant reservoir 212. The passage 278 includes a lubricant outlet 280, a drive fluid inlet 282, and a drive fluid outlet 284. The lubricant outlet 280 is in fluid communication with the lubricant passage 266. The drive fluid inlet 282 is in fluid communication with drive fluid being supplied to the hammer. In the depicted embodiment, the drive fluid inlet 282 is in fluid communication with the passage 252 in the sleeve 228 via a fluid passage (not shown). In other embodiments, the drive fluid inlet 282 may be in fluid communication with the drive fluid being supplied to the hammer at other locations in the drive fluid circuit. The drive fluid outlet 284 is utilized to divert drive fluid away from the hammer piston 126. In the depicted embodiment, the drive fluid outlet 282 is in fluid communication with drive fluid source 142 in order to dump fluid back to the supply.

A movable valve member 290 is positioned in the passage 278 and is movable between a first position in which the drive fluid inlet 282 and the drive fluid outlet 284 are not in fluid communication with each other and a second position in which the drive fluid inlet 282 and the drive fluid outlet 284 are in fluid communication with each other. The movable valve member may be configured in a variety of ways. In the depicted embodiment, the valve member 290 includes a first end 292, a lubricant seal portion 294, a drive fluid seal portion 296, and a second end 298. The first end 292 is configured to engage the projection 276 of the plunger 274. In the depicted embodiment, the first end 292 is configured to be received inside the hollow projection of the lubricant reservoir 212.

The lubricant seal portion 294 is configured to prevent lubricant from mixing with drive fluid within the passage 278. In the depicted embodiment, the lubricant seal portion 294 includes a portion having an outside diameter that is slightly smaller than the inside diameter of the passage 278. The lubricant seal portion 294 houses one or more seals, such as an o-ring seals, that engage the inner surface of the passage 278.

The drive fluid seal portion 296 is configured to prevent the flow of drive fluid into a certain portion of the passage 278 when desired. In the depicted embodiment, the drive fluid seal portion 296 includes a portion having an outside diameter that slightly smaller than the inside diameter of the passage 278. The drive fluid seal portion 296 houses a first seal 300 is configured to block the flow of drive fluid from the drive fluid inlet 282 into the passage 278 when the valve is in the first position and a second seal 302 that prevents the flow of drive fluid past the second end 298 of the valve member 290.

The second end 298 of the valve member 290 has an aperture 303 that leads to a recess in which a spring 304 is received. The spring 304 biases the valve member 290 toward the first position.

INDUSTRIAL APPLICABILITY

In use, the hammer lubrication system is connected, by fasteners for example, to a hammer 110, as shown in FIG. 4. In the depicted embodiment, the lubrication system 200 is mounted directly on a hammer rather than on a carrier machine, so the lubrication system travels with the hammer even if the hammer is moved from the machine.

The drive fluid source 142 is connected to the drive fluid inlet 144 which directs drive fluid to the drive fluid inlet 250 on the sleeve 228. Thus, drive fluid is diverted through the lubrication system 200 before being directed, via the drive fluid outlet 240, to act on the hammer piston 126. The lubricant is provided to the lubrication points through pre-existing lubricant ports/channels in the hammer. Therefore, at least some embodiments of the invention can be used with existing hammers without modification to the hammers.

Before the hammer is activated, the spool 230 is in the first position shown in FIG. 4, with the spring 262 urging the spool 230 against the dividing wall 248. When the hammer is activated, pressurized drive fluid is supplied to the drive fluid inlet 250. The drive fluid passes through the passage 252, and out of the drive fluid outlet 240 to be directed to act on the piston 126.

Drive fluid pressure in the passage 252 also acts on the projection 258 of the spool 230. Sufficient drive fluid pressure will move the spool 230 to a second position (left to right in FIG. 4). When the spool 230 moves from the first position to the second position, the volume in lubricant charge chamber 264 decreases. When the volume decreases, some of the lubricant in the lubricant charge chamber 264 is forced through lubricant delivery passages to bearing lubrication points on the hammer 110. The drive fluid pressure acting on projection 258 must create sufficient force to overcome the bias of the spring 262 and the pressure of the lubricant in the lubricant charge chamber 264 and lubricant delivery passages. Configuring the first contact surface area A1 to be greater than the second contact surface area A2, such as having the ratio of first contact surface area A1 to second contact surface area A2 be in the range of approximately 2.2:1 to approximately 1.8:1, allows for movement of the spool even when drive fluid pressure is much less than lubricant pressure.

When the hammer is deactivated, the drive pressure in passage 252 decays. When the drive pressure has decayed sufficiently, the spring 262 urges the spool 230 to the first position and against the dividing wall 248. The movement of the spool 230 back to the first position increases the volume of the lubricant charge chamber 264. Increasing in volume of the lubricant charge chamber 264 produces a suction force which pulls in new lubricant to the lubricant charge chamber 264 from the reservoirs 212, via the lubricant inlet passages, such as passage 266. Thus, the movement of the spool and changing volume of the lubricant charge chamber 264 acts as a lubricant pumping mechanism 306.

The lubricant is drawn in a generally uniform manner from the reservoirs 212. This replenishes the lubricant charge chamber 264, so that when the hammer 110 is next activated, the process can begin again. Thus, the hammer 110 is lubricated each time the hammer is activated.

When the lubricant reservoir 212 has a sufficient amount of lubricant, the valve member 290 is in a first position as shown in FIG. 5. In the first position, the drive fluid seal portion 296 is positioned to block drive fluid inlet 282. In other words, the first seal 300 is positioned between the drive fluid inlet 282 and the drive fluid outlet 284 thus preventing the flow of hydraulic fluid into passage 278. Since drive fluid inlet 282 is in fluid communication with passage 252 in the sleeve 228, drive fluid in the passage 252 is not diverted to the passage 278 in the housing 210.

If the level of lubricant in the lubricant reservoir 212 reaches a predetermined low level, such as substantially empty, the projection 276 on the plunger 274 will engage the first end 292 of the valve member 290 and move the valve member toward the second position, shown in FIG. 6. In the second position, the drive fluid seal portion 296 is positioned to allow fluid communication between the drive fluid inlet 282 and the drive fluid outlet 284. Since drive fluid inlet 282 is in fluid communication with passage 252 in the sleeve 228, drive fluid in the passage 252 is diverted to the passage 278 and out of the drive fluid outlet 284. In the depicted embodiment, drive fluid outlet 284 is fluidly connected back to the drive fluid source 142.

Diverting all or a portion of the drive fluid from passage 252 back to the drive fluid source 142 results in derating or deactivating the hammer. Thus, the lubrication system 200 has an automatic derate or shutoff feature when the level of lubricant is too low or the lubricant reservoir is empty.

In the depicted embodiment, a mechanical input (the plunger moving the valve) is used to activate the automatic derate/shut-off feature. In other embodiments, other inputs may be used. For example, a differential pressure may be established across a movable valve member. In one embodiment, lubricant pressure on one side of a movable valve may balance drive fluid pressure or atmospheric pressure on the other side of the movable valve. When the lubricant supply runs out, the pressure on the lubricant side of the valve decreases sufficiently to cause the valve to move and drive fluid to be dumped or diverted away from the piston. In other embodiments, an acoustic and/or visual signal may also be activated when the lubricant level is low or empty.

In this embodiment, the lubrication system is directly mounted to the body of the hammer. As a result, no external hoses or other components are required, which reduces the risk of damage to the lubrication system during use of the hammer. Furthermore, on externally mounted systems, cold conditions may cause the lubricant to become too viscous and difficult to pump. In this embodiment, the temperature of the breaking tool helps heat the lubricant, thus reducing cold temperature pumping problems.

This embodiment uses the surfaces of the spool and the cap sleeve to act as pumping elements, both to pump lubricant to the hammer during activation of the hammer and to draw new lubricant into the lubricant charge chamber during deactivation of the hammer. Therefore, no additional pump is required. The pumping action is activated by the drive fluid pressure, so no additional pumping power supply is needed.

This embodiment uses a dual tube lubricant supply (the two reservoirs), which extends the time between replacement of the reservoirs. The lubricant is pumped to the lubrication points by a single pumping mechanism rather than having a separate pumping mechanism for each reservoir, thus ensuring a reliable operation and minimizing the number of components needed. In alternative embodiments, one or more than two reservoirs could be provided.

While the disclosed embodiments have been illustrated and described in detail in the drawings and foregoing description, such illustration and description is to be considered as exemplary and not restrictive in character, it being understood that only certain exemplary embodiments have been shown and described and that all changes and modifications that come within the scope of the disclosure are desired to be protected. For example, in alternative embodiments, the bearing surfaces of the hammer may be lubricated upon deactivation of the hammer, instead of upon activation. In such embodiments, the lubricant charge chamber may be replenished whilst the hammer is being activated, instead of upon deactivation.

In some embodiments, the spool 230 is a single component and the valve member 290 is a single component. In alternative embodiments, however, the spool and/or the valve member could comprise two or more separate components which are coupled for movement together.

The disclosed embodiments are not limited to use with demolition hammers. Rather, they may be used with any work tool powered by a drive fluid where lubrication of surfaces of the work tool is desired. In addition, other configurations of the valve assembly are possible.

It will be apparent to those skilled in the art that various modifications and variations can be made to the disclosed dosing system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A lubrication system for a tool powered by a drive fluid, comprising:

a valve member movable from a first position to a second position in response to receiving an input indicative of a low level of a lubricant, wherein in the second position, the valve member is configured to divert the drive fluid to shutdown or derate the tool; and wherein the input indicative of a low level of lubricant comprises a plunger, associated with a lubricant reservoir, engaging the valve member.

2. The lubrication system according to claim 1 wherein the plunger is disposed within the lubricant reservoir.

3. The lubrication system according to claim 1 wherein the lubricant reservoir is a grease cartridge.

4. The lubrication system according to claim 1 further comprising:
a housing having a drive fluid inlet and a drive fluid outlet; wherein the valve member is disposed in the housing, and wherein in the first position the drive fluid inlet is not in fluid communication with the drive fluid outlet and in the second position the drive fluid inlet is in fluid communication with the drive fluid outlet.

5. The lubrication system according to claim 4 wherein the housing is configured to mount to the tool.

6. The lubrication system according to claim 4 wherein the valve member is disposed within a passage in the housing, the passage being in fluid communication with the drive fluid inlet and the drive fluid outlet.

7. The lubrication system according to claim 6 wherein the valve member comprises:
a first end;
a second end distal from the first end;
a lubricant seal portion located between the first end and the second end, the lubricant seal portion configured to prevent the lubricant from mixing with drive fluid within the passage;
a drive fluid seal portion located between the lubricant seal portion and the second end, the drive fluid seal portion configured to block a flow of drive fluid into the passage when the valve member is in the first position.

8. The lubrication system according to claim 7 further comprising a spring that biases the valve member toward the first position, wherein the spring is received through an aperture in the second end.

9. The lubrication system according to claim 7 wherein the drive fluid seal portion includes a first seal configured to prevent the flow of drive fluid toward the first end of the valve member when the valve member is in the first position and a second seal configured to prevent the flow of drive fluid past the second end of the valve member.

10. A lubrication system for a tool powered by a drive fluid, comprising:
a housing configured to receive a lubricant reservoir;
a spool disposed at least partially in the housing, the spool adapted to move between a first position and a second position in response to fluid pressure of the drive fluid; and
a lubricant pumping mechanism operable by movement of the spool between the first position and the second position to displace a lubricant from the lubricant reservoir; and a drive fluid inlet; a drive fluid outlet; and a valve member disposed in the housing, the valve member movable from a first position to a second position in response to receiving an input indicative of a low level of lubricant, wherein in the second position the drive fluid inlet is in communication with the drive fluid outlet; and wherein the input indicative of a low level of lubricant comprises a plunger, associated with a lubricant reservoir, engaging the valve member.

11. The lubrication system according to claim 10 further comprising a valve assembly, the valve assembly including:
the spool;
a first sleeve extending outward from the housing;
a second sleeve received at least partially in the housing;
wherein the spool is received at least partially within the first sleeve and the second sleeve.

12. The lubrication system according to claim 11 wherein the spool and the second sleeve form a lubricant charge chamber.

13. The lubrication system according to claim 12 wherein movement of the spool between the first position and the second position forces the lubricant out of the lubricant charge chamber.

* * * * *